(12) United States Patent
Yu

(10) Patent No.: US 8,401,506 B2
(45) Date of Patent: *Mar. 19, 2013

(54) METHOD AND SYSTEM FOR TESTING THE RADIATION PERFORMANCE OF WIRELESS TERMINAL BASED ON DATA MODE

(75) Inventor: Zhong Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 141 days.

This patent is subject to a terminal disclaimer.

(21) Appl. No.: 12/992,737

(22) PCT Filed: Dec. 31, 2008

(86) PCT No.: PCT/CN2008/073902
§ 371 (c)(1),
(2), (4) Date: Jan. 11, 2011

(87) PCT Pub. No.: WO2009/137979
PCT Pub. Date: Nov. 19, 2009

(65) Prior Publication Data
US 2011/0095950 A1    Apr. 28, 2011

(30) Foreign Application Priority Data
May 15, 2008    (CN) .......................... 2008 1 0100247

(51) Int. Cl.
*H04B 1/06* (2006.01)
(52) U.S. Cl. ........................................ 455/261; 324/627
(58) Field of Classification Search .................... 455/261
See application file for complete search history.

(56) References Cited

U.S. PATENT DOCUMENTS

| | | | | |
|---|---|---|---|---|
| 6,127,980 A * | 10/2000 | Podgorski | ..................... | 343/703 |
| 6,492,957 B2 | 12/2002 | Carillo et al. | | |
| 2004/0183547 A1 * | 9/2004 | Kildal | ........................... | 324/627 |
| 2006/0055592 A1 * | 3/2006 | Leather et al. | ................. | 342/174 |
| 2010/0136510 A1 * | 6/2010 | Sakezles | ........................ | 434/274 |

FOREIGN PATENT DOCUMENTS

| | | |
|---|---|---|
| CN | 101090553 | 12/2007 |
| CN | 101106792 | 1/2008 |

OTHER PUBLICATIONS

CTIA Certification, Test Plan for Mobile Station Over the Air Performance Revision 2.2, p. 105, paragraph C.3, p. 90, figure A-6, p. 101, paragraph B.2.1, p. 91, figure A-7, p. 93, figure A-9, Nov. 30, 2006.
International Search Report for International Application No. PCT/CN2008/073902 dated Apr. 2, 2009.

* cited by examiner

*Primary Examiner* — Ajibola Akinyemi

(74) *Attorney, Agent, or Firm* — Li & Cai Intellectual Property (USA) Office

(57) ABSTRACT

The invention provides a method and system for the wireless terminal radiation performance test based on a data mode, and wherein, the method comprises: building a human body model, in which the upper limb of the model holds the device under test at a predefined distance in front of the head of the model; taking the antenna of the device under test as the origin to build a spherical coordinate and selecting a testing point in the spherical coordinate; placing the model under the circumstance of a full-anechoic chamber, enabling the device under test to work in a data mode, and collecting the total radiated power at the testing point in the spherical placement system using the testing antenna, so as to obtain the total radiated power of the device under test. Through using the invention, the performance effect of human body coupling on the mobile terminal in a data mode could be reflected truly. It has higher authenticity and is easy to use.

4 Claims, 4 Drawing Sheets

METHOD AND SYSTEM FOR TESTING THE RADIATION PERFORMANCE OF WIRELESS TERMINAL BASED ON DATA MODE

CROSS-REFERENCE TO RELATED APPLICATIONS

This application is a National Phase Application of PCT International Application No. PCT/CN2008/073902, International Filing Date Dec. 31, 2008, claiming priority of Chinese Patent Application No. 200810100247.5, filed May 15, 2008 which is hereby incorporated by reference in its entirety.

FIELD OF THE INVENTION

The invention relates to the field of communication, and in particular, to a system and a method the wireless terminal radiation performance test based on a data mode.

BACKGROUND ART

In recent years, the radio frequency performance test on wireless terminal has attracted more and more attention. The final emitting and receiving performances of a wireless terminal may be objectively reflected by testing the radiation performance of the entire machine. At present, there are mainly two methods to evaluate the radiation performance of wireless terminals. One is to make the determination based on the radiation performance of antennas, focusing on the evaluation of the radiation performance of wireless terminals from the radiation parameters of antennas, such as gain, efficiency and directional diagram, which is called passive test. The other is to test the spatial radio frequency performance, such as radiated power, of wireless terminals in a given microwave dark room, which is called active test.

At present, only the wireless terminals passing full type approval (FTA) test can be sold on the market. In the FTA test, a radio-frequency performance test is mainly carried out on a wireless terminal in a cable connection mode, and no explicit regulation is given as to the spatial radio-frequency performance of the entire wireless terminal, however, over the air (OTA) test can make up the shortcomings of the FTA test in this aspect. Meanwhile, wireless terminal manufactures should have a clear understanding on the radiation performance of the wireless terminals manufactured and need to improve the emitting and receiving performances of wireless terminals through various measures, because the wireless terminals with poor radiation performance will bring much inconvenience to the users. In particular, when a wireless terminal is used for communication, the emitting and receiving performance thereof is reduced since the human body is close to the antenna of the wireless terminal, and consequently, the overall radiation emitting and receiving performance of the wireless terminal will reduce. Therefore, the influence of the human body on the emitting and receiving performance of a wireless terminal should be quantitatively measured in the research and development process of the wireless terminal to carry out an optimization design so as to avoid a dramatic reduction in the emitting and receiving performance of the wireless terminal, that is, to reduce the electromagnetic coupling effect between the human body and an antenna. Emitting parameters include total radiated power (TRP for short) and receiving parameters include total radiated sensitivity (TRS for short).

The TRP of a mobile terminal is used for measuring the actual total radiated power of a device under test, which reflects the emitting power of the entire wireless terminal, which is related to the emitting power and antenna radiation performance of the wireless terminal in the conduction condition.

The TRP is defined as the integral of the emitting power in different directions on the whole radiation sphere:

$$TRP = \frac{1}{4\pi} \oint (EIRP_\theta(\Omega; f) + EIRP_\varphi(\Omega; f)) d\Omega \quad \text{formula (1)}$$

wherein $\Omega$ is a solid angle for describing direction, f is frequency, $\theta$ and $\phi$ are orthogonally polarized, $EIRP_\theta$ and $EIRP_\phi$ are actual emitting power levels in the corresponding planned directions. Therefore, the following relation is available:

$$TRP \approx \quad \text{formula (2)}$$
$$\frac{\pi}{2NM} \sum_{n=0}^{N-1} \sum_{m=0}^{M-1} [EIRP_\theta(\theta_n, \varphi_m; f) + EIRP_\varphi(\theta_n, \varphi_m; f)] \sin(\theta_n)$$

wherein N and M are multiple sampling intervals for $\theta$ and $\phi$; $\theta_n$ and $\phi_m$ are testing angles;

$EiRP_\theta(\theta_n, \phi_m)$ is the value of the horizontal polarization component of the equivalent omnidirectional radiated power of the testing point having angles of $\theta_n$ and $\phi_m$, with the unit being milliwatt;

$EiRP_\phi(\theta_n, \phi_m)$ is the value of the vertical polarization component of the equivalent omnidirectional radiated power of the testing point having testing angles of $\theta_n$ and $\phi_m$, with the unit being milliwatt.

The currently used device and method for testing TRP of spatial radio-frequency performances are both aimed at voice mode, only relating to free space or human head and not completely reflecting the influence of the electromagnetic coupling of antenna and human hand or even human body in a data mode, thus, the test result of the scheme above is not accurate.

SUMMARY OF THE INVENTION

Considering that in related technologies, existing TRP testing scheme for spatial radio-frequency performance test does not completely reflect the influence of the electromagnetic coupling of antenna and human hand or even human body in a data mode and the test result is consequently inaccurate, the present invention provides a method and a system for the wireless terminal radiation performance test based on a data mode to solve at least one of the above problems.

In order to realize the above purpose, in accordance with one aspect of the invention, a method for the wireless terminal radiation performance test based on a data mode is provided.

The method comprises: building a human body model, in which, the upper limb of the model holds the device under test (DUT) at a predefined distance in front of the head of the model; taking the antenna of the device under test as the origin to build a spherical coordinate and selecting a testing point in the spherical coordinate; placing the model under the circumstance of a full-anechoic chamber, enable the device under test to work in the a data mode, and collecting the total radiated power at the testing points in a spherical placement system using the testing antenna, so as to obtain the total radiated power of the device under test.

The process of building the model further comprises: filling the model with artificial human tissue fluid.

Preferably, the testing antenna is a dual-polarized antenna.

Wherein, the total radiated power collected at each testing point comprises a horizontal polarization component and a vertical polarization component.

Moreover, after the horizontal polarization component and the vertical polarization component are acquired, the processing of obtaining the radiated power of the device under test specifically comprises:

respectively obtaining the total radiated power of each testing point according to formula (1):

$$TRP = \frac{1}{4\pi} \oint (EIRP_\theta(\Omega; f) + EIRP_\varphi(\Omega; f)) d\Omega \quad \text{formula (1)}$$

wherein TRP is the total radiated power of the current testing point, Ω is the solid direction angle of the current testing point in the spherical coordinate system, $EIRP_\theta$ and $EIRP_\varphi$ are the horizontal and vertical polarization components at the solid direction angle respectively, and f is the current working frequency of the device under test; and obtaining the total radiated power of the device under test according to formula (2):

$$TRP \approx$$

$$\frac{\pi}{2NM} \sum_{n=0}^{N-1} \sum_{m=0}^{M-1} [EIRP_\theta(\theta_n, \varphi_m; f) + EIRP_\varphi(\theta_n, \varphi_m; f)] \sin(\theta_n) \quad \text{formula (2)}$$

wherein TRP is the total radiated power of the device under test, N and M are multiple sampling intervals for θ and φ respectively, $\theta_n$ and $\phi_m$ are testing angles, $EIRP_\theta(\theta_n,\phi_m)$ is the horizontal polarization component of the testing point having the testing angles of $\theta_n$ and $\phi_m$. $EIRP_\phi(\theta_n,\phi_m)$ is the vertical polarization component of the testing point having the testing angles of $\theta_n$ and $\phi_m$, and f is the current working frequency of the device under test.

To implement the objective above, according another aspect of the invention, a system for testing the radiation performance of a wireless terminal in a data mode is provided.

The system comprises: a full-anechoic chamber, configured to provide a test environment for a wireless terminal; a human body model, the upper limb of the model holds a device under test at a predefined distance in front of the head of the model; a spherical coordinate building and testing module, configured to take the antenna of the device under test as the origin to build a spherical coordinate and to select a testing point in the spherical coordinate; a spherical placement system, configured to control the angle position of the wireless terminal with respect to the testing antenna in the spherical coordinate; the testing antenna, configured to collect the total radiated power of the wireless terminal at the testing point under control of the spherical placement system when the wireless terminal is in a data mode; and a processing unit, configured to obtain the total radiated power of the device under test according to the total radiated power at the testing point.

Wherein, the human body model is filled with artificial human tissue fluid.

In addition, the testing antenna is a dual-polarized antenna.

Wherein, the total radiated power collected at each testing point comprises a horizontal polarization component and a vertical polarization component.

With at least one of the above technical schemes, through the present invention, the performance influence of a human body coupling on a mobile terminal in a data mode could be reflected truly. The invention has higher facticity and is easy to use.

BRIEF DESCRIPTION OF THE ACCOMPANYING DRAWINGS

The figures explained herein are provided as one part of the application for a better understanding on the invention, and the exemplary embodiments of the invention and description thereof are given to illustrate the invention but not to limit the invention, in the following figures.

DETAILED DESCRIPTION OF THE INVENTION

Function Summary

In the technical schemes provided by the embodiments of the present invention, a human body model is built, the antenna of the device under test is taken as the origin to build a spherical coordinate and a testing point is selected in the spherical coordinate, wherein the upper limb of the model holds a device under test at a predefined distance in front of the head of the model. The model is placed under the circumstance of a full-anechoic chamber and the device under test is set to work in a data mode, and the total radiated power at the testing points is collected by using the testing antenna in the spherical placement system, so as to obtain the total radiated power of the device under test.

The present invention will be described in detail hereinafter in the embodiments and drawings of the present invention. It should be noted that, if no conflict is caused, the embodiments of the invention and features thereof can be combined with each other.

Method Embodiments of the Invention

According to the embodiments of the present invention, a method for testing the radiation performance of a wireless terminal in a data mode is provided. The embodiment is described in conjunction with FIGS. 1 and 2, wherein FIG. 1 illustrates a flowchart of the method for the wireless terminal radiation performance test based on a data mode according to one embodiment of the present invention, and FIG. 2 illustrates a schematic drawing of a human body model used in the method for testing the radiation performance of a wireless terminal in a data mode according to an embodiment of the present invention.

Figure 1:
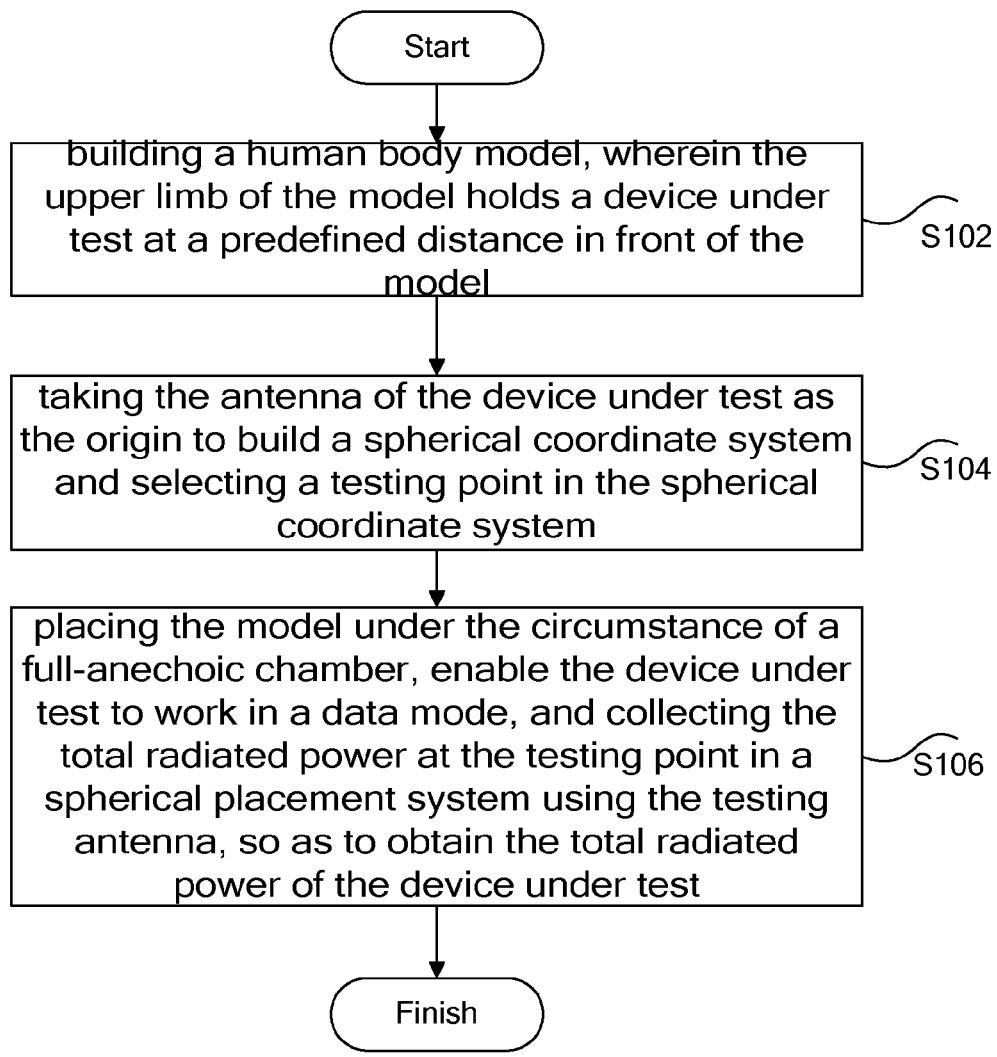
FIG. 1 is the flow diagram of the method for the wireless terminal radiation performance test based on a data mode according to an embodiment of the method of the invention.
Figure 2:
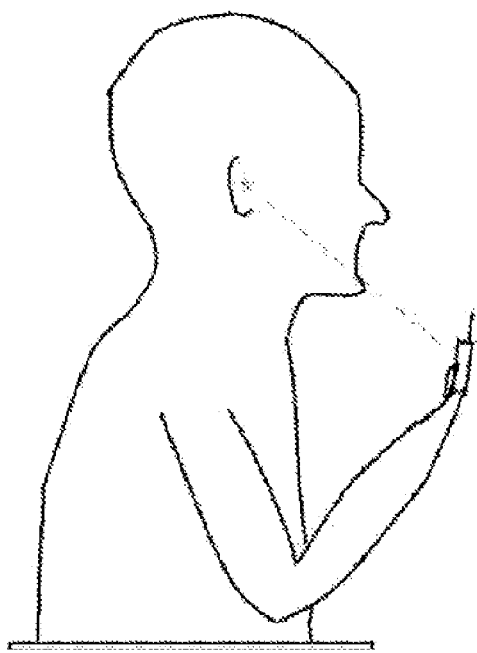
FIG. 2 is the schematic diagram of the human body model used in the method for the wireless terminal radiation performance test based on a data mode according to an embodiment of the method of the invention.

As shown in FIG. 1, the method for testing the radiation performance of a wireless terminal based on a data mode according to an embodiment comprises:

Step S102, building a human body model, wherein the upper limb of the model holds a device under test at a predefined distance in front of the model, as shown in FIG. 2, the human body model can be an upper-half model of human body; Step S104, taking the antenna of the device under test as the origin to build a spherical coordinate system and selecting a testing point in the spherical coordinate system; Step S106, placing the model under the circumstance of a full-anechoic chamber, enable the device under test to work in a data mode, and collecting the total radiated power at the testing point in a spherical placement system using the testing antenna, so as to obtain the total radiated power of the device under test.

Figure 3:
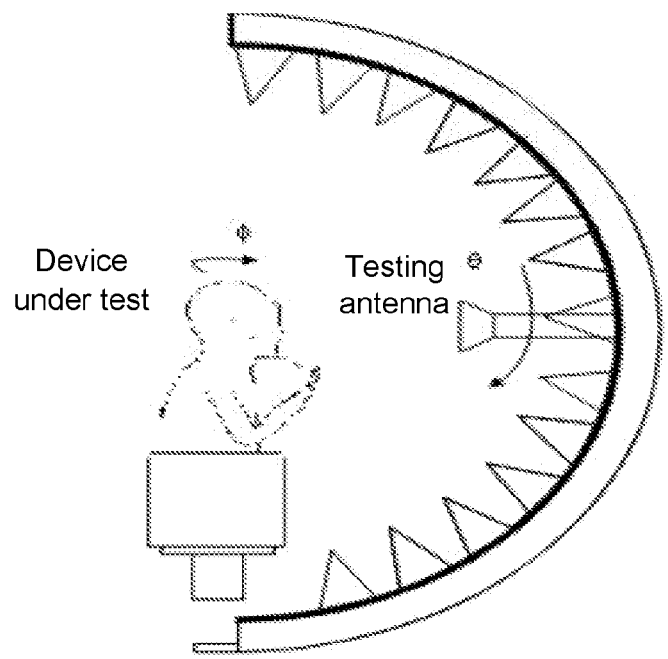
FIG. 3 is the schematic diagram of the placement of the human body model in the implementation process of the method for the wireless terminal radiation performance test based on a data mode according to an embodiment of the method of the invention.

FIG. 3 is the schematic diagram of changing the angle of the terminal with respect to the testing antenna to make the testing antenna to sample at the testing point, wherein the model holding a terminal can rotate in the horizontal plane, the probe antenna can move on the plane vertical to the horizontal plane along the spherical surface to carry out a sampling to obtain the sampling result of each testing point. Of course, other rotation and/or moving manners can be adopted, and no more description is given here.

In Step S102, the processing of building the model may comprise: filling artificial human tissue fluid in the model.

In Step S106, the testing antenna is a dual polarization antenna. In this case, the total radiated power collected at each testing point comprises a horizontal polarization component and a vertical polarization component.

Moreover, after the horizontal polarization component and the vertical polarization component are acquired, the processing of obtaining the radiated power of the device under test specifically comprises:

Respectively obtaining the total radiated power of each testing point according to formula (1):

$$TRP = \frac{1}{4\pi} \oint (EIRP_\theta(\Omega; f) + EIRP_\varphi(\Omega; f)) d\Omega, \quad \text{formula (1)}$$

wherein TRP is the total radiated power of the current testing point, $\Omega$ is the solid direction angle of the current testing point in the spherical coordinate system, $EIRP_\theta$ and $EIRP_\varphi$ are the horizontal and vertical polarization components at the solid direction angle respectively, and f is the current working frequency of the device under test; and obtaining the total radiated power of the device under test according to formula (2):

$$TRP \approx \frac{\pi}{2NM} \sum_{n=0}^{N-1} \sum_{m=0}^{M-1} [EIRP_\theta(\theta_n, \varphi_m; f) + EIRP_\varphi(\theta_n, \varphi_m; f)] \sin(\theta_n) \quad \text{formula (2)}$$

wherein TRP is the total radiated power of the device under test, N and M are multiple sampling intervals for $\theta$ and $\phi$ respectively, $\theta_n$ and $\phi_m$ are testing angles, $EIRP_\theta(\theta_n,\phi_m)$ is the horizontal polarization component of the testing point having the testing angles of $\theta_n$ and $\phi_m$, $EIRP_\varphi(\theta_n,\phi_m)$ is the vertical polarization component of the testing point having the testing angles of $\theta_n$ and $\phi_m$, and f is the current working frequency of the device under test.

Figure 4:
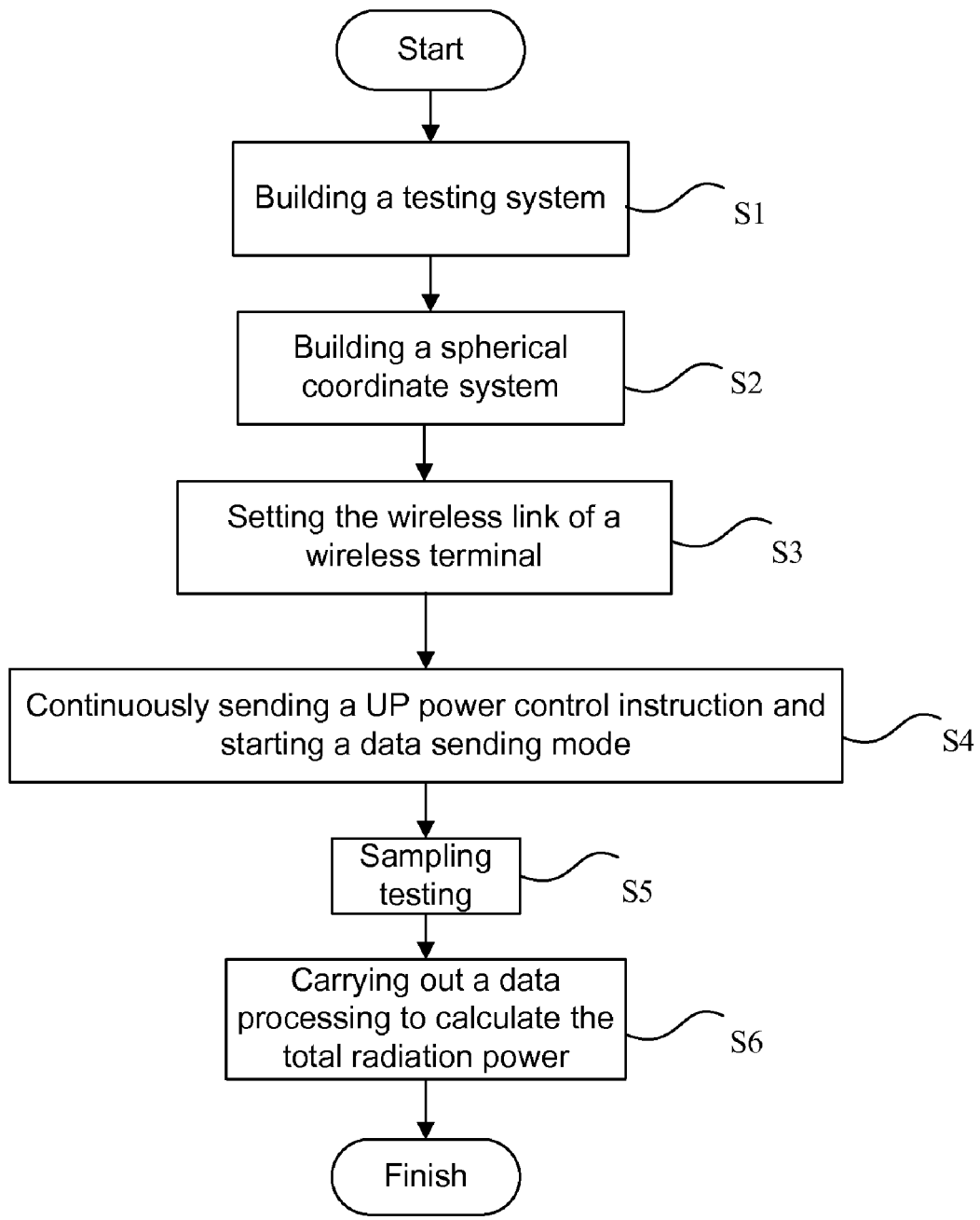
FIG. 4 is the flow diagram of the processing example of the method for the wireless terminal radiation performance test based on a data mode according to an embodiment of the method of the invention.

FIG. 4 is the flow diagram of the processing example of the method for the wireless terminal radiation performance test based on a data mode according to an embodiment of the method of the invention, as shown in FIG. 4, the method may include the following steps (Steps S1-S6) in practical application:

Step S1, setting the position of a wireless terminal in a data mode according to the human body model and building a testing system;

Step S2, building a spherical coordinate system by taking the position of the antenna of the wireless terminal as the origin and selecting a testing point;

Step S3, setting the wireless link of the wireless terminal and enabling the wireless link to be in a normal working state to meet the testing conditions;

Step S4, continuously sending UP power control commands to the wireless terminal, and starting a data sending mode when the wireless terminal reaches the maximum power;

Step S5, carrying out a sampling test at the testing point and respectively collecting, in the horizontal direction and the vertical direction, the horizontal polarization component $EIRP_\theta(\theta_n,\phi_m)$ and the vertical polarization component $EIRP_\varphi(\theta_n,\phi_m)$ of equivalent omnidirectional transmitting power;

Step S6, carrying out a linear averaging on the data collected at the testing points to obtain a desired total radiated power (TRP).

The steps S1-S6 are described in detail below.

Step S1, setting the position of a wireless terminal according to the human body model and building a testing system. As shown in FIG. 2, the human body model is required to simulate a real human being holding a wireless terminal in a data mode in one hand or two hands. The human body model includes a head, a hand holding a wireless terminal and the upper part or the whole part of the body. In the testing circumstance, the origin of the spherical coordinate is transferred to the position of the current device, namely, in the vicinity of the chest of the human body model. The human body model is filled with artificial human tissue fluid, the formula of which meets standard and related regulation: for example, the following formula can be adopted: water (45.3%), sugar (54.3%), hydroxyethylcellulose (0.3%) and antiseptic (0.1%), the percentages above are weight percentages. Moreover, the hand is at a predefined distance away from the head, for example, 40 cm; in addition, the hand is also at a predefined distance away from the chest, for example, 20 cm, and preferably, the joint of the arm of the built human body model is movable. Therefore, the distance between the hand-hold wireless terminal and the head or the chest is adjustable.

Step S2, building a spherical coordinate system by taking the position of the antenna of the wireless terminal as the origin and selecting the testing point, specifically, two positioning systems of a combined shaft system and a distributed shaft system can be defined based on a spherical test method, wherein in the combined shaft system, two rotary shafts are independent from each other, a Phi shaft positioner is installed on the basis of a Theta shaft positioner, then the DUT can rotate around the two shafts synchronously, while in the distributed shaft system, two rotary shafts are combined with each other, a testing antenna can rotate around a Theta shaft, and the DUT can rotate around a Phi shaft.

Step S3, setting the wireless link of the wireless terminal and enabling the wireless link to be in a normal working state to meet testing conditions; preferably, in this step, the DUT should select a high frequency channel, an intermediate frequency channel and a low frequency channel from all the frequency bands it supports to establish a link to carry out test. The DUT of a telescopic antenna should be tested in both extended state and contracted state.

Step S4, continuously sending the UP power control commands to the wireless terminal, and starting a data sending mode when the wireless terminal reaches the maximum power.

Step S5, carrying out a sampling test at the testing point and respectively collecting the horizontal polarization component $EiRP_\theta(\theta_n,\phi_m)$ and the vertical polarization component $EiRP_\phi(\theta_n,\phi_m)$ of equivalent omnidirectional radiated power in the horizontal direction and the vertical direction; and an effective sampling can be carried out in a 3D space by controlling the relative position between the DUT and the testing antenna. Moreover, in the TRP test, it is required to measure the effective radiated power of each point.

Step S6, the spatial radio frequency performance index, total radiated power (TRP) of the mobile terminal equipment or other wireless communications products is obtained by the data measured at respective testing points through formulas (1) and (2).

The above describes the present invention by taking the upper limb model as an example, but the present invention may also use a full body model for the measurement with the testing method similar to the method above, which will not be repeated here.

System Embodiments of the Invention

In the embodiments, a system for the wireless terminal performance test based on a data mode is provided.

Figure 5:
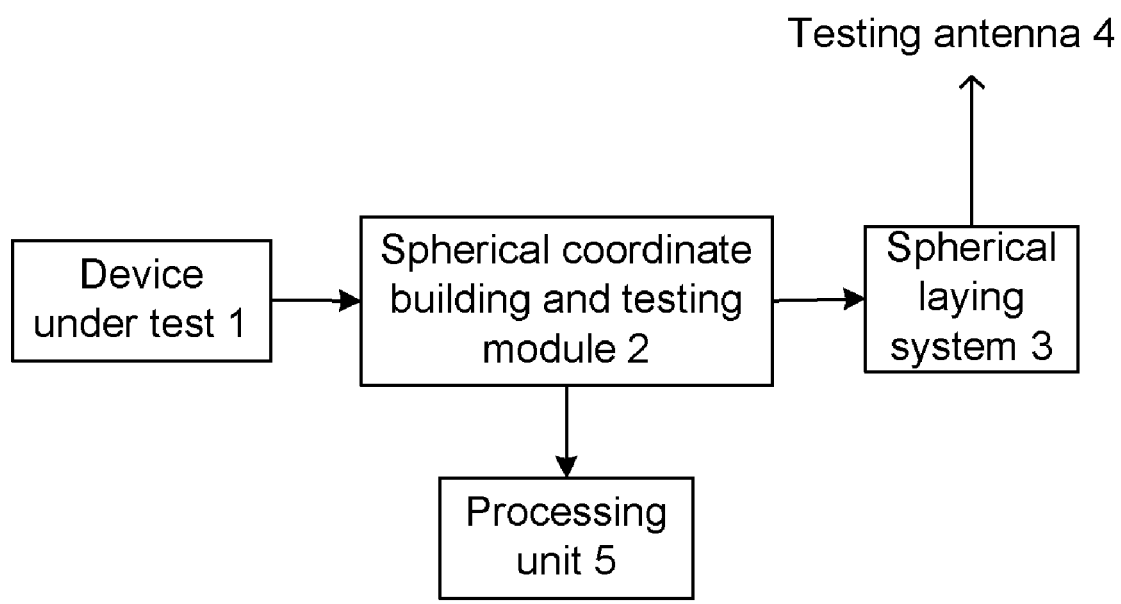
FIG. 5 is the preferable frame diagram of the system for the wireless terminal radiation performance test based on a data mode according to an embodiment of the system of the invention.

In accordance with an embodiment, the system for the wireless terminal radiation performance test based on a data mode may comprise a full-anechoic chamber configured to provide a testing circumstance for a wireless terminal and a human body model (hereinafter, model for short), wherein the upper limb of the model holds a device under test at a predefined distance in front of the head of the model, the distance, to which no limitation is given by this invention, can be flexibly adjusted by simulating the practical application scenarios according to the requirements of the test, the design or the implementation, without causing any influence on the essence of the invention. FIG. 5 is the preferable frame diagram of the system for the wireless terminal radiation performance test based on a data mode according to the system embodiments of the invention, as shown in FIG. 5, the system comprises a device under test 1 and preferably comprises the following functional modules: a spherical coordinate building and testing module 2, configured to take the antenna of the device under test as the origin to build a spherical coordinate and to select the testing point in the spherical coordinate; a spherical placement system 3, configured to control the angle position of the wireless terminal with respect to the testing antenna in the spherical coordinate; a testing antenna 4, configured to collect the total radiated power of the wireless terminal at the testing point under the control of the spherical placement system 3 when the wireless terminal is in a data mode; and a processing unit 5, configured to obtain the total radiated power of the device under test 1 according to the radiated power obtained at the testing point.

Wherein, the human body model can be an upper limb model or a whole human body model, which is filled with artificial human tissue fluid.

In the system, the full-anechoic chamber can fully insulate the electromagnetic interference from external environment and maintain the shielding effectiveness thereof in the range from 800 Hz to 4 GHz to meet the requirements of EN50147-1 standard. The size of the silent zone of the full-anechoic chamber should meet test requirements.

The spherical coordinate building and testing module 2 is configured to build a spherical coordinate, and for a wireless communication product, to build a spherical coordinate defined by an axis x, an axis y and an axis z by taking the wireless communication product as the origin, wherein angle $\theta$ is the angle between the testing point and the positive direction of the axis z, angle $\phi$ is the angle between the positive direction of the axis x and the projection point of the testing point in the plane defined by the axis x and the axis y, and to select the testing coordinate point in the spherical coordinate.

In the spherical placement system 3, in order to cover the whole spherical surface, the final structure of the testing circumstance consists of a support structure and a testing placer for holding the DUT and manipulating the DUT with respect to the testing antenna, this system is a radiation model capable of moving a DUT/model and/or the testing antenna to cover the whole spherical surface of the DUT to realize a sampling at each testing point.

The testing antenna 4 may be a dual-polarized antenna which is configured to obtain two orthogonal components of the electric field vector at each point of the spherical surface. At this time, the total radiated power collected at each testing point comprises a horizontal polarization component and a vertical polarization component.

The device under test mentioned above may include a single-mode terminal, the single mode here includes time division-synchronization code division multiple access (TD-SCDMA), wideband code division multiple access (WCDMA), code division multiple access (CDMA), global system for mobile communication (GSM), personal handyphone system (PHS, also known as Little Smart), Bluetooth, wireless local area network (wireless LAN), global positioning system (GPS), radio frequency ID (RFID) and worldwide Interoperability for microwave access (WiMAX) and other communication modes or combinations thereof.

In summary, with the technical schemes of the invention, the performance influence of a human body coupling on a mobile terminal in a data mode could be reflected truly. The invention has higher facticity and is easy to use.

Obviously, it should be understood by those skilled in the art that the modules or steps of the invention can be realized by universal computers, centralized on a single computer or distributed on the network consisting of multiple computers, and optionally, realized by computer-executable program codes, and the modules or steps can be therefore stored in a storage device to be executed by computers or manufactured into integrated circuit modules respectively, or some of the modules or steps are manufactured into a single integrated circuit module. Thus, the invention is not limited to any special combination of hardware and software.

The mentioned above is only preferable embodiments of the invention but not limitation for the invention, various modification and variations can be devised by those skilled in the art, and it should be understood that any modification, equivalent and improvement devised without departing from the spirit and principle of the invention belong to the protection scope of the invention.

The invention claimed is:

1. A method for the wireless terminal radiation performance test based on a data mode, comprising:
building a human body model, in which the upper limb of the model holds the device under test at a predefined distance in front of the head of the model;
taking a dual-polarized antenna of the device under test as the origin to build a spherical coordinate and selecting a testing point in the spherical coordinate;
placing the model under the circumstance of a full-anechoic chamber, enabling the device under test to work in a data mode, and collecting the total radiated power at the testing point in the spherical placement system using the dual-polarized antenna wherein the total radiated power collected at each testing point includes a horizontal polarization component and a vertical polarization component;
obtaining the total radiated power of the device under test by steps of:
respectively obtaining the total radiated power at each testing point according to formula (1):

$$TRP = \frac{1}{4\pi} \oint (EIRP_\theta(\Omega; f) + EIRP_\varphi(\Omega; f)) d\Omega, \quad \text{formula (1)}$$

wherein TRP is the total radiated power of the current testing point, $\Omega$ is the solid direction angle of the current testing point in the spherical coordinate system, $EIRP_\theta$ and $EIRP_\varphi$ are the horizontal and vertical polarization components at the solid direction angle respectively, and f is the current working frequency of the device under test; and obtaining the total radiated power of the device under test according to formula (2)

$$TRP \approx \quad \text{formula (2)}$$
$$\frac{\pi}{2NM} \sum_{n=0}^{N-1} \sum_{m=0}^{M-1} [EIRP_\theta(\theta_n, \varphi_m; f) + EIRP_\varphi(\theta_n, \varphi_m; f)] \sin(\theta_n),$$

wherein TRP is the total radiated power of the device under test, N and M are multiple sampling intervals for $\theta$ and $\varphi$ respectively, $\theta_n$ and $\varphi_m$ are testing angles, $EiRP_\theta(\theta_n,\varphi_m)$ is the horizontal polarization component of the testing point having the testing angles $\theta_n$ and $\varphi_m$, $EIRP_\theta(\theta_n,\varphi_m)$ is the vertical polarization component of the testing point having the testing angles of $\theta$ and $\varphi_i$, and f is the current working frequency of the device under test.

2. The method according to claim 1, wherein the process of building a human body model further comprises: filling the model with artificial human tissue fluid.

3. A system for wireless terminal radiation performance test based on a data mode, comprising:
a full-anechoic chamber, configured to provide a testing circumstance for a wireless terminal;
a human body model, the upper limb of which holds a device under test at a predefined distance in the front of the head of the human body model;
a spherical coordinate building and testing module, configured to take a dual-polarized antenna of the device under test as the origin to build a spherical coordinate and to select a testing point in the spherical coordinate;
a spherical placement system, configured to control the angle position of the wireless terminal with respect to the dual-polarized antenna in the spherical coordinate;
the dual-polarized antenna, configured to collect the total radiated power of the wireless terminal at the testing point under the control of the spherical placement system when the wireless terminal is in a data mode;
a processing unit, configured to obtain the total radiated power of the device under test according to the total radiated power obtained at the testing point; and
a storage device, storing program codes for obtaining the total radiated power, which includes a horizontal polarization component and a vertical polarization component at each testing point, and the storage device comprises the program codes executed by the processing unit for:
respectively obtaining the total radiated power at each testing point according to formula (1):

$$TRP = \frac{1}{4\pi} \oint (EIRP_\theta(\Omega; f) + EIRP_\varphi(\Omega; f)) d\Omega, \quad \text{formula (1)}$$

wherein TRP is the total radiated power of the current testing point, $\Omega$ is the solid direction angle of the current testing point in the spherical coordinate system, $EIRP_\theta$ and $EIRP_\varphi$ are the horizontal and vertical polarization components at the solid direction angle respectively, and f is the current working frequency of the device under test; and obtaining the total radiated power of the device under test according to formula (2)

$$TRP \approx \quad \text{formula (2)}$$
$$\frac{\pi}{2NM} \sum_{n=0}^{N-1} \sum_{m=0}^{M-1} [EIRP_\theta(\theta_n, \varphi_m; f) + EIRP_\varphi(\theta_n, \varphi_m; f)] \sin(\theta),$$

wherein TRP is the total radiated power of the device under test, N and M are multiple sampling intervals for $\theta$ and $\varphi$ respectively, $\theta_n$ and $\varphi_m$ are testing angles, $EiRP_\theta(\theta_n,\varphi_m)$ is the horizontal polarization component of the testing point having the testing angles of $\theta_n$ and $\varphi_m$, $EiRP_\theta(\theta_n, \varphi_m)$ is the vertical polarization component of the testing point having the testing angles of $\theta$ and $\varphi_i$, and f is the current working frequency of the device under test.

4. The system according to claim 3, wherein the human body model is filled with artificial human tissue fluid.

* * * * *